United States Patent [19]
Williams

[11] Patent Number: 5,330,807
[45] Date of Patent: Jul. 19, 1994

[54] COMPOSITE TUBING WITH LOW COEFFICIENT OF EXPANSION FOR USE IN MARINE PRODUCTION RISER SYSTEMS

[75] Inventor: Jerry G. Williams, Ponca City, Okla.

[73] Assignee: Conoco Inc., Ponca City, Okla.

[21] Appl. No.: 495,054

[22] Filed: Mar. 15, 1990

[51] Int. Cl.$^5$ ................. B32B 1/08; F16L 11/02
[52] U.S. Cl. ....................... 428/34.5; 428/220; 428/376; 428/34.7; 428/36.1; 428/36.2; 428/36.3; 428/34.6; 428/36.91
[58] Field of Search ............. 138/125, 126, 129, 130, 138/132; 428/34.5, 36.1, 36.2, 36.3, 296, 34.6, 376, 34.7, 401, 36.91, 220

[56] References Cited

U.S. PATENT DOCUMENTS

| | | | |
|---|---|---|---|
| 3,905,398 | 9/1975 | Johansen et al. | 138/125 |
| 4,079,165 | 3/1978 | Morley | 428/366 |
| 4,098,333 | 7/1978 | Wells | 166/0.5 |
| 4,200,126 | 4/1980 | Fish | 138/133 |
| 4,470,722 | 9/1984 | Gregory | 405/195 |
| 4,477,207 | 10/1984 | Johnson | 405/195 |

Primary Examiner—Charles R. Nold
Attorney, Agent, or Firm—M. Kathryn Braquet Tsirigotis

[57] ABSTRACT

Composite laminated tubing with low coefficient of thermal expansion and preferably a Poisson's ratio near 0.5 is used for production tubing which is subject to substantial expansion and contraction.

5 Claims, 1 Drawing Sheet

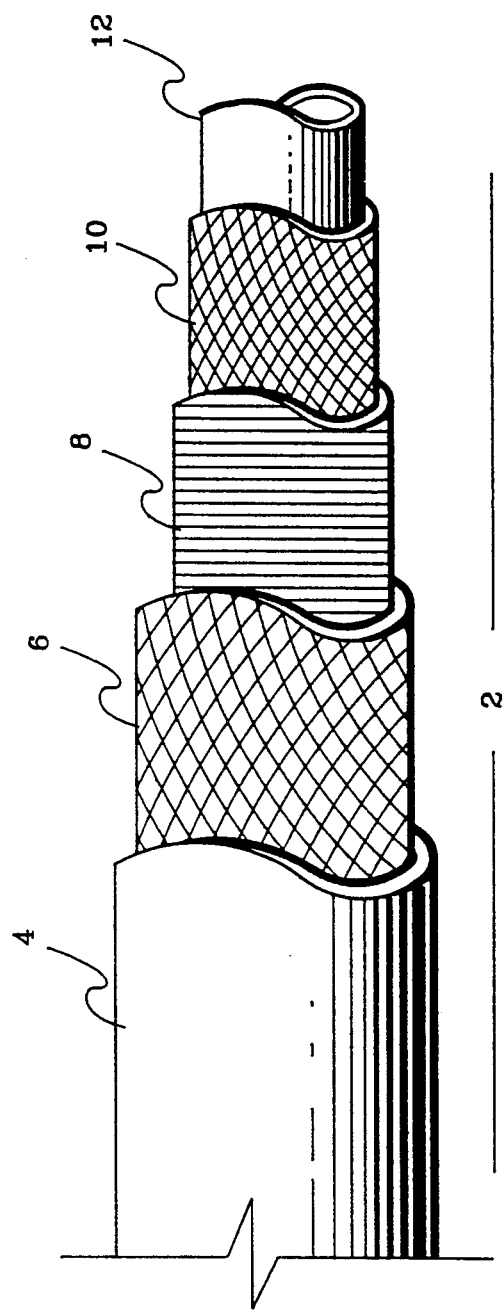

COMPOSITE TUBING WITH LOW COEFFICIENT OF EXPANSION FOR USE IN MARINE PRODUCTION RISER SYSTEMS

BACKGROUND OF THE INVENTION

In producing crude oil in offshore areas, floating production systems have been used to transfer large volumes of fluids between subsea installations and the water surface. Floating production systems are becoming more attractive as petroleum production extends to water depths beyond the economic and physical limitation of fixed platforms and to distances beyond the economic limits of pipelines. Most floating production systems have wellheads and special production manifolds on or near the ocean floor and processing equipment and storage facilities on a moored floating vessel. Fluid-handling lines, or conduits, are used to transfer hydrocarbons between the subsea wellheads or manifold systems on the ocean floor and the vessel mounted production equipment.

In many production systems, the oil is produced from formations at an elevated temperature, as much as several hundred degrees above the temperature of the surrounding water. The tubing through which the oil is produced is thus subjected to a wide range of temperatures ranging from sea water temperature (during shutdown of operations) to several hundred degrees during production of hot oil. To accommodate this variation in temperature, it is necessary to provide an expansion joint in the production tubing to prevent buckling and possible tubing failure due to expansion and contraction of the tubing. For example, a production tubing 2000 feet long will expand in length approximately 32 inches when heated from 68° F. to 300° F. Such expansion requires an expansion joint for production from a well in deep waters, such as from a tension leg platform.

The production tubing is usually placed in a marine riser which serves as a retainer for tubing failures. Since no reliable seal design is available for marine expansion joints, these joints invariably leak and the riser is subject to filling with oil. Thus, the back-up safety system in effect becomes the primary oil retention vessel. This is a serious compromise with regard to safety and reliability.

It would be desirable to provide a marine riser system which is not subject to these deficiencies.

PRIOR ART

U.S. Pat. No. 4,098,333 to Wells et al. discloses riser pipes in an offshore production system which are covered with a foam material held in place with DuPont Kevlar ® strapping.

U.S. Pat. No. 4,477,207 to Johnson discloses a buoyancy assembly for marine risers in which tension bars are used to hold the assembly together. In one embodiment, the tension bar assembly includes a strap which is made from DuPont Kevlar ® plastic.

U.S. Pat. No. 4,470,722 to Gregory discloses the use of DuPont Kevlar ® plastic strapping to hold together a series of housing sections which form a marine riser.

THE INVENTION

The invention is directed to composite laminated tubing having a low coefficient of thermal expansion, not greater than $6 \times 10^{-7}$ in/in-°F. and a Poisson's ratio near 0.5. The composite tubing is used in services where it is subject to periodic expansion and contraction. The preferred service is in tubing producing hot oil in a marine riser.

BRIEF DESCRIPTION OF THE DRAWING

The FIGURE is a schematic drawing in cross-section of a preferred embodiment of a composite laminated tubing.

DETAILED DESCRIPTION OF THE INVENTION

The preferred embodiment of the invention is best described by reference to the drawing which shows a cross section of a composite laminated tubing 2. Tubing 2 is made up of an inner liner 12, several layers of composite material 6, 8, and 10 and an outer protective sheath 4.

Within the constraints of the properties desired in the finished product, a variety of composite fibers may be employed in the manufacture of the composite laminated tubing. These include materials such as graphite fibers, glass fibers, ceramic fibers, polymer fibers, for example from Kevlar ® polymer which is a product of the DuPont company and from Exten polymer which is a product of the Goodyear Corporations. The fibers contained in each layer of composite fiber material in composite laminated tubing 2 are held together with a plastic binder such as vinyl ester, epoxy or a thermosetting or thermoplastic resin.

Referring again to the drawing, composite fiber 10 is placed on inner liner 12 in cross plies and oriented at an angle to the axis of composite laminated tubing 2. Composite fiber material 8 is placed on top of fiber material 10 and is oriented at approximately 90° to the axis of composite laminated tubing 2. Composite fiber material 6 which is placed on top of fiber material 8 is cross plied and oriented at an angle to the axis of composite laminated tubing 2 in the same manner as fiber material 10. Composite fiber material 6 may be the same as composite fiber material 10, however, this is not necessary and another fiber material may be used.

The cross-plied fibers may be placed at any angle to the axis of the composite laminated tubing to meet the design constraints of the tubing. Usually the angle of orientation will be between about 20 and about 60 degrees. The fibers are placed in cross-plies of equal and opposite angles, for example, +20 −20 degrees +45−45 degrees, etc. While the drawing shows a composite laminated tubing made up of two cross-ply fibers and one 90 degree fiber, this is for illustration purposes only. Any number of different fibers may be used and the orientation of such fibers is not limited, except by the design consideration of the composite laminated tubing. The percentage of various materials contained in the cross-section will vary depending on the specific design requirements as well as the stacking sequence and the number of plies contained in the cross-section.

As shown in the drawing, all of the layers of fiber material are covered with an outer protective sheath 4 which completes the composite laminated tubing 2. Each of the layers of fiber material are held together with a plastic binder such as one of those previously described.

Since composite laminated tubing 2 will be handling heated fluids inner liner 12 is preferably comprised of an abrasion, heat and chemically resistant material to provide a pressure tight chamber. Materials such as Rilsan ® which is sold by ATO Chem, Teflon ®, Kevlar ®, Nylon, and Hytrel ®, sold by DuPont, or Kevlar ® frit may be used for this purpose.

In service, composite laminated tubing 2 may be subject to friction during handling and when it is moved into the well. In view of this outer protective sheath 4 is preferably comprised of an abrasion resistant material. Here again, materials such as Kevlar ®, Teflon ®, Nylon, Rilsan ®, Hytrel ®, or Kevlar ® frit may be used to form this protective covering.

In addition to having a low coefficient of thermal expansion, several other constraints are important to the design of the composite laminated tubing. For example, the Poisson's ratio preferably should be near 0.5, within the range of about 0.40 to about 0.60, which prevents changes in the length of the composite laminated tubing 2 due to internal pressure loads. It is also important for pressure applications to keep the circumferential modulus high to carry the imposed pressure loads and prevent external pressure collapse. The composite laminated tubing may be used over a wide range of pressures, up to as high as 10,000 psi, depending on the size of the tubing and the load requirements. There are many combinations of fiber materials which can be used to meet the necessary design requirements.

The composite laminated tubing may be constructed in any desired size and wall thickness to meet the requirements of the particular service use of the tubing. Usually, the tubing will be made in sizes varying from about 2 to about 8 inches o.d. and with wall thickness varying from about 0.1 to about 1.0 inches.

The laminated plate theory may be used to calculate the coefficient of thermal expansion of a composite tubing composed of multiple layers of unidirectional composite fibers called lamina. This theory is described in Tsai, S. and Hahn, H. "Introduction to Composite Materials" Technomic Publishing Company, Stamford, Conn. 1980, which is hereby incorporated by reference. This theory is readily available in composite computer programs written by researchers active in the field of composites or from sources such as Compcal, Technomic Publishing Company, Lancaster, Pa. or from Tsai, S. W., "Composites Design Third Addition", Think Composites, Dayton, Ohio 1987, both of which are hereby incorporated by reference. To design a composite laminated tubing to meet selected design constraints, a material system is selected from which unidirectional lamina orthotropic properties such as modulus, Poisson's ratio, and thermal coefficient of expansion are known. Such properties may be obtained from the manufacturer of the materials or from independent tests. The selection of the material system is not constrained to a single material although at least one of the constituent materials must have a near 0 coefficient of thermal expansion, normally in the principal axis, that is the direction of the fiber. Next, an assumption is made of a design composed of several layers of lamina oriented in precise directions relative to the primary axis of composite laminated tubing. Using the laminated plate theory described in the reference above, the coefficient of thermal expansion for the assumed design is calculated. Since the computer codes for this calculation operate at a very high rate of speed, it is possible to do a parametric study of many designs, varying the lamina thickness and fiber direction and very quickly establish a trend toward or away from the desired coefficient of thermal expansion. It is possible to home in on the desired coefficient of thermal expansion by making small changes in the thickness or orientation of the fibers. This procedure is continued until the desired coefficient of thermal expansion, Poisson's ratio and other design constraints are met.

The above methodology can be automated to arrive at an optimum design by using modern principles of optimized design such as contained in the computer code called "Conmin. Constrained Function Minimization" available from the Cosmic Software Catalog. 1985 ed. In utilizing this technique, the variables of the problem (material thickness and orientation) are systematically varied by the computer program and non linear mathematics algorithms are used to arrive at an optimum solution within the bounds set for the coefficient of thermal expansion and other properties.

The following examples are presented in illustration of the invention.

EXAMPLE 1

Several examples of composite laminated tubing design calculated by the procedure set forth above are presented in Table 1.

TABLE 1

| Tubing | Fibers | Layers | Thickness of Each Layer - in | Fiber Orientation Relative to Tubing Axis - Degrees | TUBING PROPERTIES ||||
|---|---|---|---|---|---|---|---|---|
| | | | | | Coefficient of Thermal Expansion in/in-°F. | Poisson's Ratio | Axial Modulus psi | Circumferential Modulus psi | Shear Modulus psi |
| 1 | Kevlar | 4 | 0.03000 | +41/−41/90/−41/+41 | $1.3 \times 10^{-9}$ | 0.486 | $2.4 \times 10^6$ | $2.9 \times 10^6$ | $2.1 \times 10^6$ |
| | E-Glass | 1 | 0.05850 | | | | | | |
| 2 | Graphite | 4 | 0.03000 | +25/−25/90/−25/+25 | $9.1 \times 10^{-9}$ | 0.626 | $9.6 \times 10^6$ | $3.3 \times 10^6$ | $2.7 \times 10^6$ |
| | S-Glass | 1 | 0.04795 | | | | | | |
| 3 | Graphite | 4 | 0.03000 | +25/−25/90/−25/+25 | $1.4 \times 10^{-8}$ | 0.626 | $9.6 \times 10^6$ | $3.3 \times 10^6$ | $2.7 \times 10^6$ |
| | S-Glass | 1 | 0.04794 | | | | | | |
| 4 | Graphite | 2 | 0.0975 | +56*/+22/−22/−56* | $-2.9 \times 10^{-8}$ | 0.451 | $4.11 \times 10^6$ | $4.7 \times 10^6$ | $3.2 \times 10^6$ |
| | Kevlar | 2 | 0.0625 | | | | | | |

*Graphite orientation.

Referring to tubings 2 and 3 in Table 1, it is noted that a very small change in the thickness of the S-glass layer produces a substantial change in the coefficient of thermal expansion of the tubing. In each of the examples, the coefficient of thermal expansion is very small compared to the value for steel which is $6 \times 10^{-6}$. Also, each tubing has a Poisson's ratio within the desired range previously set forth.

EXAMPLE 2

A composite laminated tubing was fabricated from graphite fibers and epoxy. The composition and properties of the tubing are given in Table 2.

TABLE 2

| Layer | Thickness-in | Fiber Orientation-degrees |
|---|---|---|

TABLE 2-continued

| | | |
|---|---|---|
| 1 | 0.040 | 90 |
| 2 | 0.060 | 30 |
| 3 | 0.060 | −30 |
| 4 | 0.020 | 90 |
| 5 | 0.060 | 30 |
| 6 | 0.060 | −30 |
| 7 | 0.020 | 90 |
| 8 | 0.060 | 30 |
| 9 | 0.060 | −30 |
| 10 | 0.020 | 90 |
| 11 | 0.060 | 30 |
| 12 | 0.060 | −30 |
| 13 | 0.020 | 90 |
| Coefficient of thermal expansion | | $2.3 \times 10^{-7}$ |
| Poisson's Ratio | | 0.51 |
| Axial Modulus | | $8.3 \times 10^6$ |
| Circumferential Modulus | | $5.1 \times 10^6$ |
| Shear Modulus | | $3.3 \times 10^6$ |
| Total Thickness | | 0.60 in |

It is noted that in the tubing described in Table 2, the sequence of fiber orientation i.e. 30, −30, 90, 30, −30, is repeated to obtain the desired wall thickness of the composite laminated tubing. To obtain greater strength the stacking sequence and thickness of layers shown in Table 1 may likewise be adjusted if the percentage of material oriented at each angle is maintained to yield the same properties shown in Table 1.

The composite laminated tubing of the invention having a low coefficient of thermal expansion is useful in any service where expansion of the tubing must be restricted, for example, where the tubing is attached at both ends; and the tubing is subjected to substantial variations in temperature which cause expansion and contraction of the tubing. The tubing is especially useful in the production of hot oil from offshore platforms, particularly when the water depth from which the oil is produced is substantial. By appropriately controlling the coefficient of thermal expansion and the Poisson's ratio of the composite laminated tubing, it is possible to move hot oil through long lengths of tubing which are subjected to substantial temperature variation without the necessity for making provision for expansion and contraction of the tubing.

Efficient processing of produced fluids on offshore platforms requires the fluids be at elevated temperatures. The economics of processing can thus be improved if produced fluids are delivered at the wellhead at near reservoir temperatures and thus do not require post delivery heating. Composite laminated wall construction has a through-the-thickness coefficient of thermal conductivity approximately 1/50 that of steel. Produced fluids delivered via composite laminated tubing thus experiences significantly less heat loss than they would through conventional steel tubing. The higher delivery temperature made possible through the use of composite laminated tubing yields significant economic advantage.

While certain embodiments and details have been shown for the purpose of illustrating the present invention, it will be apparent to those skilled in the art that various changes and modifications may be made herein without departing from the spirit or scope of the invention.

I claim:

1. A composite laminated tubing which substantially does not change in length in response to temperature changes for use in an environment which undergoes temperature changes and wherein it is highly desirable to minimize changes in the length of said tubing, said tubing comprising:

an elongate hollow tubular body formed of a plurality of layers of fibers fixed in a binder, each fiber layer having fibers oriented in at least one predetermined orientation, wherein at least a portion of said fibers have a low thermal coefficient of expansion and are oriented within the body to provide said tubing with an effective thermal coefficient of expansion in the longitudinal direction of not greater than $6 \times 10^{-7}$ in/in-°F. and a Poisson's ratio of from 0.4 to 0.6.

2. A composite laminated tubing which substantially does not change in length in response to temperature changes or changes in internal pressure wherein said tubing is for use in an environment which undergoes temperature changes and which is subject to changes in internal pressure and wherein it is highly desirable to minimize any changes in the length of said tubing, said tubing comprising:

an elongate hollow tubular body formed of a plurality of layers of fibers fixed in a binder, each fiber layer having fibers oriented in at least one predetermined orientation, wherein at least a portion of said fibers have a low thermal coefficient of expansion and wherein said fiber orientations provide said tubing with a thermal coefficient of expansion not greater than $6 \times 10^{-7}$ in/in−°F. and a Poisson's ratio of approximately 0.5.

3. The composite laminated tubing according to claim 2 wherein said fibers are selected from the group consisting of aramid, graphite and glass fibers.

4. The composite laminated tubing according to claim 3 wherein the fibers are oriented to provide a thermal coefficient of expansion in the range of $6 \times 10^{-8}$ to $6 \times 10^{-10}$ in/in−°F.

5. A composite laminated tubing which substantially does not change in length in response to temperature changes or changes in internal pressure wherein said tubing is for use in an environment which undergoes temperature changes and which is subject to changes in internal pressure and wherein it is highly desirable to minimize any changes in the length of said tubing, said tubing comprising:

an elongate hollow body formed of layers of oriented fibers fixed in a binder, each fiber layer having fibers oriented in at least one predetermined orientation, wherein said fibers have a low thermal coefficient of expansion and wherein said fiber orientations provide said tubing with (1) strength for withstanding elevated pressure differential between the hollow interior and the outside of said tube; (2) a thermal coefficient of expansion not greater than $6 \times 10^{-7}$ in/in−°F; and (3) a Poisson's ratio of approximately 0.5.

* * * * *